United States Patent [19]

Sedlmayr

[11] Patent Number: 5,347,644
[45] Date of Patent: Sep. 13, 1994

[54] THREE-DIMENSIONAL IMAGE DISPLAY DEVICE AND SYSTEMS AND METHODS FOR IMPLEMENTATION THEREOF

[76] Inventor: Steven R. Sedlmayr, 1948 Ellis, Mesa, Ariz. 85028

[21] Appl. No.: 898,950

[22] Filed: Jun. 11, 1992

[51] Int. Cl.⁵ .................... G02B 1/08; G02B 27/10; G02B 27/26
[52] U.S. Cl. .................... 359/465; 359/479; 359/443; 359/457; 352/61
[58] Field of Search ............... 359/478, 479, 464, 462, 359/483, 487, 495, 583, 449, 443, 459; 352/61, 58

[56] References Cited

U.S. PATENT DOCUMENTS

| | | | |
|---|---|---|---|
| 2,423,503 | 7/1947 | Land et al. | 359/465 |
| 2,933,994 | 4/1960 | Bauer | 359/478 |
| 3,248,165 | 4/1966 | Marks et al. | 359/465 |
| 3,697,675 | 10/1972 | Beard et al. | 358/91 |
| 4,127,322 | 11/1978 | Jacobson et al. | 353/31 |
| 4,151,549 | 4/1979 | Bautze | 358/3 |
| 4,191,456 | 3/1980 | Hong et al. | 353/31 |
| 4,295,153 | 10/1981 | Gibson | 358/3 |
| 4,295,159 | 10/1981 | Carollo et al. | 358/22 |
| 4,323,920 | 4/1982 | Collender | 358/88 |
| 4,376,950 | 3/1983 | Brown et al. | 358/90 |
| 4,425,028 | 1/1984 | Gagnon et al. | 359/246 |
| 4,464,018 | 8/1984 | Gagnon | 359/41 |
| 4,464,019 | 8/1984 | Gagnon | 359/66 |
| 4,523,226 | 6/1985 | Lipton et al. | 358/88 |
| 4,541,007 | 9/1985 | Nagata | 358/3 |
| 4,544,237 | 10/1985 | Gagnon | 359/41 |
| 4,611,889 | 9/1986 | Buzak | 359/48 |
| 4,613,207 | 9/1986 | Fergason | 359/41 |
| 4,641,178 | 2/1987 | Street | 358/3 |
| 4,647,966 | 3/1987 | Phillips et al. | 358/88 |
| 4,649,425 | 3/1987 | Pund | 358/88 |
| 4,650,286 | 3/1987 | Koda et al. | 359/41 |
| 4,671,634 | 6/1987 | Kizaki et al. | 353/122 |
| 4,690,526 | 9/1987 | Ledebuhr | 353/31 |
| 4,693,557 | 9/1987 | Fergason | 359/41 |
| 4,699,498 | 10/1987 | Naemura et al. | 346/160 |
| 4,715,684 | 12/1987 | Gagnon | 359/40 |
| 4,736,246 | 4/1988 | Nishikawa | 358/88 |
| 4,739,396 | 4/1988 | Hyatt | 358/60 |
| 4,749,259 | 6/1988 | Ledebuhr | 359/41 |
| 4,770,525 | 9/1988 | Umeda et al. | 353/122 |
| 4,772,098 | 9/1988 | Ogawa | 359/40 |
| 4,772,943 | 9/1988 | Nakagawa et al. | 358/92 |
| 4,786,146 | 11/1988 | Ledebuhr et al. | 359/39 |
| 4,799,763 | 1/1989 | Davis et al. | 359/472 |
| 4,807,024 | 2/1989 | McLaurin et al. | 358/88 |
| 4,824,210 | 4/1989 | Shimazaki | 359/41 |
| 4,826,311 | 5/1989 | Ledebuhr | 353/31 |
| 4,834,473 | 5/1989 | Keyes, IV et al. | 395/275 |
| 4,836,649 | 6/1989 | Ledebuhr et al. | 359/41 |
| 4,842,374 | 6/1989 | Ledebuhr | 359/40 |
| 4,850,685 | 7/1989 | Kamakura et al. | 359/634 |
| 4,851,901 | 7/1989 | Iwasaki | 358/88 |
| 4,853,764 | 8/1989 | Sutter | 358/3 |
| 4,861,142 | 8/1989 | Tanaka et al. | 359/41 |
| 4,864,390 | 9/1989 | McKechnie et al. | 358/60 |
| 4,870,486 | 9/1989 | Nakagawa et al. | 358/92 |
| 4,872,750 | 10/1989 | Morishita | 353/7 |
| 4,875,064 | 10/1989 | Umeda et al. | 353/78 |
| 4,877,307 | 10/1989 | Kalmanash | 359/465 |
| 4,904,061 | 2/1990 | Aruga | 359/40 |
| 4,907,860 | 3/1990 | Noble | 359/42 |
| 4,911,547 | 3/1990 | Ledebuhr | 353/31 |
| 4,922,336 | 5/1990 | Morton | 358/88 |
| 4,928,123 | 5/1990 | Takafuji | 353/20 |
| 4,933,755 | 6/1990 | Dahl et al. | 358/88 |

(List continued on next page.)

*Primary Examiner*—Jon W. Henry
*Attorney, Agent, or Firm*—Duane Burton

[57] ABSTRACT

This invention relates to a three-dimensional image display device comprising two or more parallel elements, each element being formed from a transparent material, each element having a coating formed thereon, the coating including means for reflecting a portion of a beam of light having a selected predetermined orientation of a chosen component of electric field vectors and means for passing the remaining portion of the beam of light. The coating may also include an absorbing means including a dielectric absorbing means for a photo responsive means including a dielectric sensitive means.

6 Claims, 4 Drawing Sheets

U.S. PATENT DOCUMENTS

| | | | |
|---|---|---|---|
| 4,935,758 | 7/1990 | Miyatake et al. | 353/31 |
| 4,936,656 | 7/1990 | Yamashita et al. | 359/49 |
| 4,936,657 | 6/1990 | Tejima et al. | 359/40 |
| 4,936,658 | 6/1990 | Tanaka et al. | 359/40 |
| 4,943,154 | 7/1990 | Miyatake et al. | 353/31 |
| 4,943,155 | 7/1990 | Cross, Jr. | 353/33 |
| 4,945,408 | 7/1990 | Medina | 358/88 |
| 4,954,890 | 9/1990 | Park | 358/88 |
| 4,957,351 | 9/1990 | Shioji | 359/94 |
| 4,959,641 | 9/1990 | Bass et al. | 340/700 |
| 4,962,422 | 10/1990 | Ohtomo et al. | 358/88 |
| 4,963,959 | 10/1990 | Drewlo | 358/88 |
| 4,995,702 | 2/1991 | Aruga | 359/40 |
| 4,995,718 | 2/1991 | Jachimowicz et al. | 353/31 |
| 5,048,949 | 9/1991 | Sato et al. | 353/77 |
| 5,060,058 | 10/1991 | Goldenberg et al. | 358/60 |
| 5,144,482 | 9/1992 | Gould | 359/478 |
| 5,193,015 | 3/1993 | Shanks | 359/443 |

THREE-DIMENSIONAL IMAGE DISPLAY DEVICE AND SYSTEMS AND METHODS FOR IMPLEMENTATION THEREOF

FIELD OF THE INVENTION

This invention relates to a method and system for producing a three-dimentional image display device comprising two or more parallel elements and its usage with a projection type color display device.

BACKGROUND OF THE INVENTION

A disturbance (change in position or state of individual particles) in the fabric of space-time causes a sphere of influence. Stated in a simplistic manner, the action of one particle influences the actions of the others near it. This sphere of influence is referred to as a "field", and this field is designated as either electric or magnetic (after the way it influences other particles). The direction of travel of the particle is called the direction of propagation. The propagation of the particle, the sphere of influence, and the way it influences other particles is called an electromagnetic wave, and is shown in FIG. 1.

Figure 1:
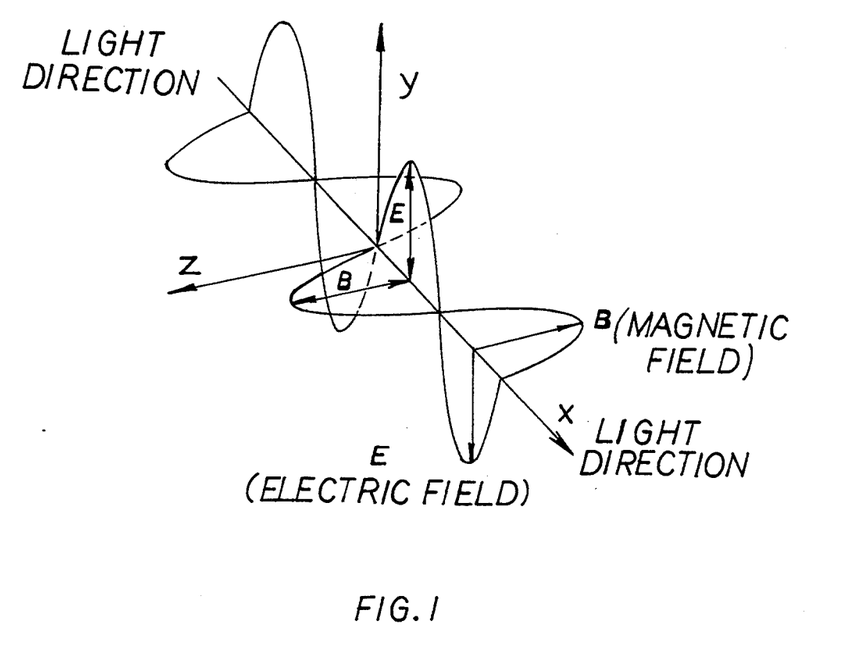
FIG. 1 is an illustrative drawing of an electromagnetic wave with the direction of propagation, electric and magnetic fields shown.
Figure 1A:
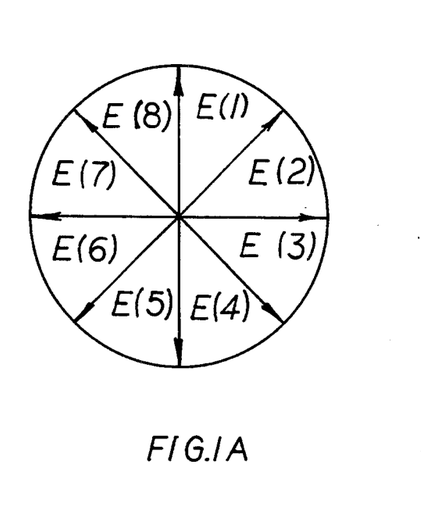
FIG. 1A is an illustrative drawing looking at an electromagnetic wave down the axis of propagation showing various directions of possible different orientations of the electric field vector for illustrative purposes.

As shown in FIG. 1, the electric and magnetic fields are orthogonal (at right angles) to each other and the direction of propagation. These fields can be mathematically expressed as a vector quantity (indicating the direction of influence along with strength, i.e., magnitude, of influence) at a specific point or in a given region in space. Thus, FIG. 1A is the electromagnetic wave in FIG. 1, but with the view of looking down the axis of propagation, that is, down the x axis of FIG. 1. FIG. 1A shows some possible various electric field vectors that could exist, although it should be understood that any and all possible vectors can exist around the circle, each having different magnitudes.

Figure 1B:
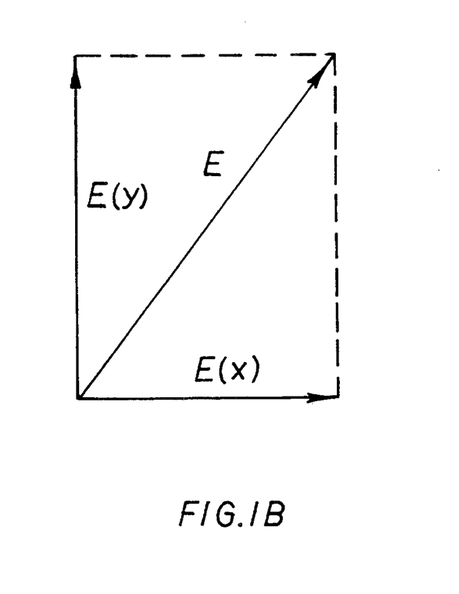
FIG. 1B is an illustrative drawing of the resolution of an electric field vector into two components, along an x and y axis.

Vectors can be resolved into constituent components along two axes. This is done for convenience sake and for generating a frame of reference that we, as humans, can understand. By referring to FIG. 1B, it is shown that the electric field vector E, can be resolved into two constituent components, E(y) and E(x). These quantities, then, describe the orientation and the magnitude of the electric field vector along two axes, the x and y, although other axes or systems could be chosen. The same applies to magnetic fields, except that the X and Z axes would be involved.

The way the electric and magnetic fields vary with time in intensity and direction of propagation have been determined by several notable mathematicians and physicists, culminating in a group of basic equations by James Maxwell. These equations, simply applied, state that a field vector can be of one of several different states, that is: 1) the field vector varies randomly over a period of time, or 2) the field vector can change directions in a circular manner, or 3) the field vector can change directions in a elliptical manner, or 4) the field vector can remain constant in magnitude and direction, hence, the field vector lies in one plane, and is referred to as planar.

This orientation of a field vector and the way it changes with time is called the state of polarization.

Figure 3:
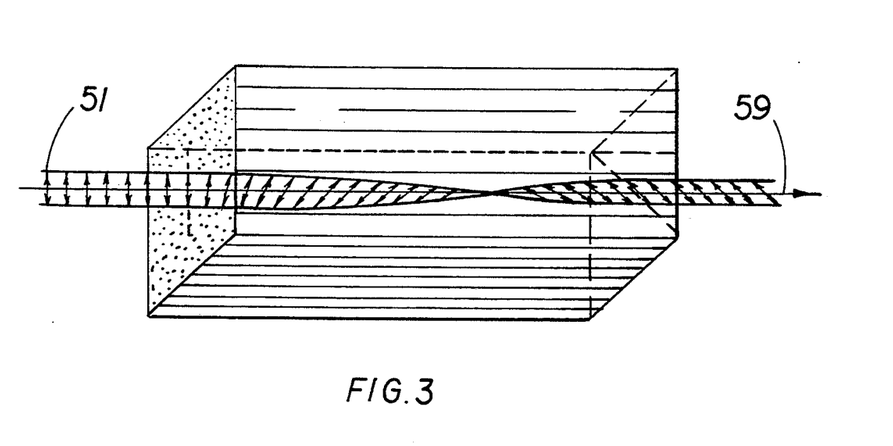
FIG. 3 is an illustrative drawing showing depicting a polarized beam impinging upon a LCD cell and the resulting retardation (changing, altering, or twisting) of the electric field vector.

Electromagnetic waves can be resolved into separate electromagnetic waves with predetermined orientations of a field vector. The electromagnetic waves with a predetermined orientation of a field vector can then be directed through materials, such as a liquid crystal device, that is capable of changing (or altering) their orientation of the field vector upon application of an outside stimulus, as is demonstrated in FIG. 3. These devices are noted as programmable electromagnetic wave field orientation rotating devices (PEMFVORD).

An electromagnetic wave can be characterized by its frequency or wavelength. The electromagnetic spectrum (range) extends from zero, the short wavelength limit, to infinity, the long wavelength limit. Different wavelength areas have been given names over the years, such as cosmic rays, alpha rays, beta rays, gamma rays, X-rays, ultraviolet, visible light, infrared, microwaves, TV and FM radio, short wave, AM, maritime communications, etc. All of these are just short hand expressions of stating a certain range of frequencies for electromagnetic waves.

Different areas of the spectrum interact with electromagnetic influences upon them in various proportions, with the low end being more influenced by magnetic fields, and the high end being influenced by electric fields. Thus to contain a nuclear reaction, a magnetic field is used, while controlling light an electric field is used.

In particular, image display systems such as video projectors utilize liquid crystal devices (LCD) acting as a PEMFVORFD for displaying a projected image. A PEMFVORD for a video projector is typically formed as a LCD having a matrix of individual cells or pixels (picture elements) arranged in a checkerboard array (see FIG. 2A). In general, the LCD is placed in a polarized (a single orientation of the electromagnetic wave electric field vector) light path and control is effected by altering the optical transmission characteristics (i.e, the birefringence) for each cell by the response to an applicable stimulus. The individual cells alter the polarization (change by rotating the polarization state or orientation of the electromagnetic wave electric field vector) of the individual cells or pixels according to the information that is desired to be finally portrayed as the projected image. The resolution of the projected image depends upon several factors, including the number of cells in the LCD. A display of 320 horizontal pixels by 240 vertical pixels will have a generally rectangular peripheral shape and yield a display of 76,800 pixels. A typical television set for the United States market is composed of 115,000 pixels (i.e., combination of red, blue and green dots in a television receiver). A light aperture for admitting light to the array of cells for the display generally is of a rectangular shape.

Figure 2:
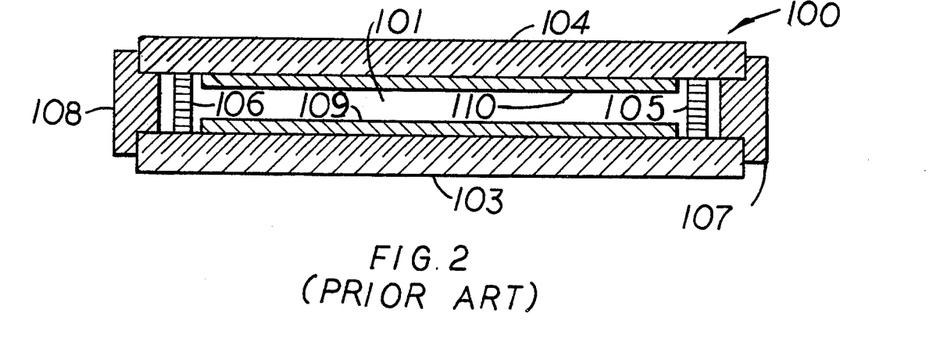
FIG. 2 is a cross-section of an LCD cell as is known in the art.

FIG. 2 illustrates a schematic cross section of an LCD cell. The LCD cell 100 includes a liquid crystal material 101 that is contained between two transparent plates 103, 104. Spacers 105, 106 are used to separate the transparent plates 103, 104. Sealing elements 107, 108 seal the liquid crystal material 101 between the transparent plates 103, 104. Conductive coatings 109, 110 on the transparent plates 103, 104 conduct the appropriate electrical signals to the liquid crystal material 101.

A type of liquid crystal material 101 used in most LCD cells for optical display systems is referred to as "twisted nematic." In general, with a twisted nematic LCD cell, the molecules of an LCD cell are rotated in the absence of a field through a 90° angle between the upper 103 and lower 104 transparent plates. When a field is applied, the molecules are untwisted and line up in the direction of the applied field. The change in alignment of the molecules causes a change in the birefringence of the cell. In the homogeneous ordering, the birefringence of the cell changes from large to small whereas the opposite occurs in the homeotropic case. The change in birefringence causes a change in the orientation of the electric field vector for the light being passing through the LCD. The amount of the rotation in the molecules for an individual LCD cell 100 will determine how much change in polarization (orientation of the electric field vector) of the light occurs for that pixel. The light beam is then passed through another component of the system (i.e., polarizer analyzer) and is resolved into different beams of light by the orientation of their electric field vectors, with the light that has a selected predetermined component of the electric field vector passing through to finally strike the screen used for the display.

A twisted nematic LCD cell requires the light incident at the LCD cell 100 to be polarized. The polarized light for a typical projector is generally derived from a randomly polarized light source that is collimated and then filtered by a plastic polarizer to provide a linear polarized beam. Linear polarized beams are conventionally referred to as being S-polarized and P-polarized with the P-polarized beam defined as polarized in a direction parallel to the plane of incidence and the S-polarized beam defined as polarized perpendicular to the plane of incidence.

The development of PEMFVORD technology has resulted in the development of LCD projectors which utilize one or more LCDs to alter the orientation of the electric field vector (see FIG. 3) of the light being projected. The birefringence of the individual LCD pixels are selectively altered by suitable apparatus such as cathode ray tubes, lasers, or electronic circuit means. A typical LCLV projector includes a source lamp which is used to generate a light beam that is directed through a polarizer. This polarized light is directed through the LCDs to change the polarization according to the image to be displayed. The light, after exiting the LCD, passes through a plastic polarizer analyzer which stops and absorbs the unwanted portion of light. The formed image is then enlarged with a projection lens system for forming an enlarged picture on a display screen.

Color LCLV projectors typically include color separating apparatus such as a prism, beam splitters or dichroic mirrors to separate collimated white light beams from the light source into three primary color beams (i.e., red, green and blue beams). The red, green and blue beams are then individually modulated by LCDs and combined by separate optical apparatus such as combining prisms, mirrors or lenses.

Representative prior art LCLV projectors are disclosed in U.S. Pat. No. 5,060,058 to Goldenberg, et al., U.S. Pat. No. 5,048,949 to Sato, et al., U.S. Pat. No. 4,995,702 to Aruga, et al., U.S. Pat. No. 4,943,154 to, Miyatake, et al., U.S. Pat. No. 4,936,658 to Tanaka, et al., U.S. Pat. No. 4,936,656 to Yamashita, et al., U.S. Pat. No. 4,935,758 to Miyatake, et al., U.S. Pat. No. 4,911,547 to Ledebuhr, U.S. Pat. No. 4,909,601 to Yajima, et al., U.S. Pat. No. 4,904,061 to Aruga, et al., U.S. Pat. No. 4,864,390 to McKechnie, U.S. Pat. No. 4,861,142 to Tanaka, et al., U.S. Pat. No. 4,850,685 to Kamakura, U.S. Pat. No. 4,842,374 to Ledebuhr, U.S. Pat. No. 4,836,649 to Ledebuhr, et al., U.S. Pat. No. 4,826,311 to Ledebuhr, U.S. Pat. No. 4,786,146 to Ledebuhr, U.S. Pat. No. 4,772,098 to Ogawa, U.S. Pat. No. 4,749,259 to Ledebuhr, U.S. Pat. No. 4,739,396 to Hyatt, U.S. Pat. No. 4,690,526 to Ledebuhr, U.S. Pat. No. 4,687,301 to Ledebuhr, U.S. Pat. No. 4,650,286 to Koda, et al., U.S. Pat. No. 4,647,966 to Phillips, et al., U.S. Pat. No. 4,544,237 to Gagnon, U.S. Pat. No. 4,500,172 to Gagnon, U.S. Pat. No. 4,464,019 to Gagnon, U.S. Pat. No. 4,464,018 to Gagnon, U.S. Pat. No. 4,461,542 to Gagnon, U.S. Pat. No. 4,425,028 to Gagnon, U.S. Pat. No. 4,191,456 to Hong, et al., U.S. Pat. No. 4,127,322 to Jacobson, et al., U.S. Pat. No. 4,588,324, to Marie, U.S. Pat. No. 4,943,155 to Cross, Jr., U.S. Pat. No. 4,936,657 to Tejima, et al., U.S. Pat. No. 4,928,123 to Takafuji, U.S. Pat. No. 4,922,336 to Morton, U.S. Pat. No. 4,875,064 to Umeda, U.S. Pat. No. 4,872,750 to Morishita, U.S. Pat. No. 4,824,210 to Shimazaki, U.S. Pat. No. 4,770,525 to Umeda, et al., U.S. Pat. No. 4,715,684 to Gagnon, U.S. Pat. No. 4,699,498 to Naemura, et al., U.S. Pat. No. 4,693,557 to Fergason, U.S. Pat. No. 4,671,634 to Kizaki, et al., U.S. Pat. No. 4,613,207 to Fergason, U.S. Pat. No. 4,611,889 to Buzak, U.S. Pat. No. 4,295,159 to Carollo, et al.

Various prior art techniques and apparatus have been heretofore proposed to present 3-D or stereographic images on a viewing screen, such as on a polarization conserving motion picture screen. See U.S. Pat. No. 4,955,718 to Jachimowicz, et al., U.S. Pat. No. 4,963,959 to Drewio, U.S. Pat. No. 4,962,422 to Ohtomo, et al., U.S. Pat. No. 4,959,641 to Bess, et al., U.S. Pat. No. 4,957,351 to Shioji, U.S. Pat. No. 4,954,890 to Park, U.S. Pat. No. 4,945,408 to Medina, U.S. Pat. No. 4,936,658 to Tanaka, et al., U.S. Pat. No. 4,933,755 to Dahl, U.S. Pat. No. 4,922,336 to Morton, U.S. Pat. No. 4,907,860 to Noble, U.S. Pat. No. 4,877,307 to Kalmanash, U.S. Pat. No. 4,872,750 to Morishita, U.S. Pat. No. 4,870,486 to Nakagawa, U.S. Pat. No. 4,853,764 to Sutter, U.S. Pat. No. 4,851,901 to Iwasaki, U.S. Pat. No. 4,834,473 to Keyes, et al., U.S. Pat. No. 4,807,024 to McLaurin, et al., U.S. Pat. No. 4,799,763 to Davis, U.S. Pat. No. 4,772,943 to Nakagawa, U.S. Pat. No. 4,736,246 to Nishikawa, U.S. Pat. No. 4,649,425 to Pund, U.S. Pat. No. 4,641,178 to Street, U.S. Pat. No. 4,541,007 to Nagata, U.S. Pat. No. 4,523,226 to Lipton, et al., U.S. Pat. No. 4,376,950 to Brown, et al., U.S. Pat. No. 4,323,920 to Collendar, U.S. Pat. No. 4,295,153 to Gibson, U.S. Pat. No. 4,151,549 to Bautzc, U.S. Pat. No. 3,697,675 to Beard, et al. In general, these techniques and apparatus involve the display of polarized or color sequential two-dimensional images which contain corresponding right eye and left eye perspective views of three-dimensional objects. These separate images can also be displayed simultaneously in different polarizations or colors. Suitable eyeware, such as glasses having different polarizing or color separating coatings, permit the separate images to be seen by one or the other eye. This type of system is relatively expensive and complicated requiring two separate projectors and is adapted mainly for stereoscopic movies for theaters. U.S. Pat. No. 4,954,890 to Park discloses a representative projector employing the technique of alternating polarization.

Another technique involves a timed sequence in which images corresponding to right-eye and left-eye perspectives are presented in timed sequence with the use of electronic light valves. U.S. Pat. No. 4,970,486 to Nakagawa, et al., and U.S. Pat. No. 4,877,307 to Kalmanash disclose representative prior art stereographic display systems of this type.

While previous time sequential light valve systems are adaptable to display arrangements for a television set, because of problems associated with color, resolution and contrast of the projected image, they have not received widespread commercial acceptance. Moreover, the systems proposed to date have also been relatively expensive and complicated.

BRIEF SUMMARY OF THE INVENTION

In accordance with the present invention, a novel system and method for producing a three-dimensional image display device is disclosed. The system and method are particularly useful in systems that employ a PEMFVORD.

A method for producing a projected visual image in accordance with the invention can also be described as follows: producing a collimated source beam of white light with a source lamp; separating and absorbing infrared and ultraviolet portions of the source beam; polarizing the source beam into two separate orthogonally polarized beams; changing a polarization direction of one of the orthogonally polarized beams with a half-wave retarder to produce two beams of the same polarization; combining the two separate beams of the same polarization into a beam of a unitary polarization having a generally rectangular peripheral configuration that matches the shape and light aperture of an LCD; separating the unitary polarized beam into a red component and into a blue-green component using a first dichroic mirror selected to reflect light having red wavelengths (i.e., greater than 600 nanometers); unitary polarized beam into a green beam using a second dichroic mirror selected to reflect light having green wavelengths (500–600 nanometers); further separating the red beam and blue beam using a third and a fourth dichroic mirror in order to provide an optimal color balance and visual effect and absorbing rejected beams; changing the orientation of the electric field vector of the individual pixels of the separate red beam, green beam and blue beams with separate LCDs to produce a separate red beam, green beam and blue beams altered by the electric field vector in respect to the individual pixels; combining the separate modulated red beam and modulated green beam into a modulated red-green beam using a fifth dichroic mirror selected to pass the green beam (wavelengths less than 595 nanometers) and reflect the red beam; combining the modulated red-green beam and the separate blue beam utilizing a sixth dichroic mirror selected to pass the red-green beam (wavelengths greater than 515 nanometers) and reflect the blue beam to form a unitary modulated beam; segregating the collinear beam a final time with an polarizer analyzer coupled to a beam block for absorbing the rejected beam; changing the orientation of the electric field vector of the individual pixels of the beam with an LCD to produce a beam altered by the electric field vector in respect to the individual pixels; projecting the modulated polarized beam onto a three-dimensional image display device comprising two or more parallel elements, each element being formed from a transparent material, each element having a coating formed thereon, the coating including means for reflecting a portion of a beam of light having a selected predetermined orientation of a chosen component of electric field vectors and means for passing the remaining portion of the beam of light.

ILLUSTRATIVE EMBODIMENT OF THE INVENTION

One illustrative embodiment of the invention comprises: a light source for producing a collimated unpolarized beam of light; a polarizing beam splitter for splitting the unpolarized source beam into separate orthogonal linear P-polarized and S-polarized light beams; a half-wave retarder for converting the S-polarized light beam back to a second polarized-polarized light beam; and an arrangement of mirrors that combines the P-polarized light beams into a rectangular shaped beam of a unitary polarization.

The light beam, at this point, is separated into a red component and into a blue-green component using a first dichroic mirror selected to reflect light having red wavelengths greater than 600 nanometers. The blue-green component is then separated into a blue beam and a green beam using a second dichroic mirror selected to reflect light having green wavelengths between 500 nanometers and 600 nanometers. As an option, the red beam and the blue beam can be further filtered in order to provide an optimum of color balance in visual effect and the rejected portions of the beams that are filtered out from the red and blue can then be absorbed. At this point, the separate red, green and blue beams are passed through liquid crystal display devices and have their electric field vectors altered according to the input signal. The separate red and green beams are combined into a red-green beam using a dichroic mirror selected to pass the green beam wavelengths less than 595 nanometers and reflect the red beam. This red-green beam is then combined with a separate blue beam utilizing another dichroic mirror selected to pass the red-green beam wavelengths greater than 515 nanometers and reflect the blue beam to form a collinear beam. This collinear beam is then passed through a polarizer analyzer to segregate the beam according its electric field vector. One of the segregated beams can be passed to an absorbing beam block. The selected segregated modulated polarized beam is passed through a LCD with the individual cells used to alter the orientation of the electric field vectors of the individual pixels. This beam is then sent through a projection lens that projects it onto a viewing apparatus.

It should be further understood that, while certain particular wavelength numbers have been given for red, blue and green, they are for illustrative purposes only and can be changed or shifted due to the type of light source used. The changing or shifting of the particular range of wavelengths of the colors is due to the final color balance that is desired.

Previously, in order to project a three-dimensional image, separate input images corresponding to the left and right eyes of the viewer (i.e., different spatial perspectives) are input into the separate left and right side LCDs of a video projector. A viewer has the choice of putting on a set of glasses over his eyes, such that the lens over the right eye is for viewing images polarized in a first direction and the lens over the left eye is for viewing images polarized in a different direction. The viewer will see a three-dimensional image if the signal provided to the driving electronics for the left/right side provide for a different signal corresponding to the different angular spatial mode of the left and right eye, i.e., the left side is a left side camera and the right side is a right side camera. These separate left side or right side images may also be viewed in three dimension by a timed sequence for achieving the 3-D effect without glasses.

For example, a system is configured such that a viewer's glasses contain a lens for viewing different orthogonally or different circularly polarized images. A left eye lens is configured for viewing P-polarized light while the right eye lens is configured for viewing S-polarized light. Alternately, as an example, the left eye lens is configured for viewing right circularly polarized light while the right eye lens is configured for viewing left circularly polarized light.

In an embodiment of this invention, the system is configured such that, in place of the viewer's glasses, a polarized screen is used. This screen is formed of a transparent material that has two or more different polarization coatings or layers. Each coating or layer reflects a certain orientation of an electric field vector and passes all other orientations of electric field vectors. Each successive layer or coating is different from the other layers. This allows certain portions of the image to be seen in depth or in actual 3-D. These types of layers or coatings are available from OCLI. For a general discussion, see "Optical Thin Films User's Handbook", by James D. Rancourt, McGraw-Hill Optical and Electro-optical Engineering Series, 1987.

In light of the previous discussions and further in the description and claims, it will become apparent that the following partial list of the advantages of the invention are:

Three-dimensional ability is achieved at very low cost allowing images to be seen in true walk-around display style. The display device is small and capable of incorporating a built in 3d projector.

Other objects, advantages and capabilities of the present invention will become more apparent as the description proceeds.

DETAILED DESCRIPTION OF THE PREFERRED EMBODIMENTS

For purposes of simplicity, the same number has been used in the various figures to identify the same part.

Figure 4:
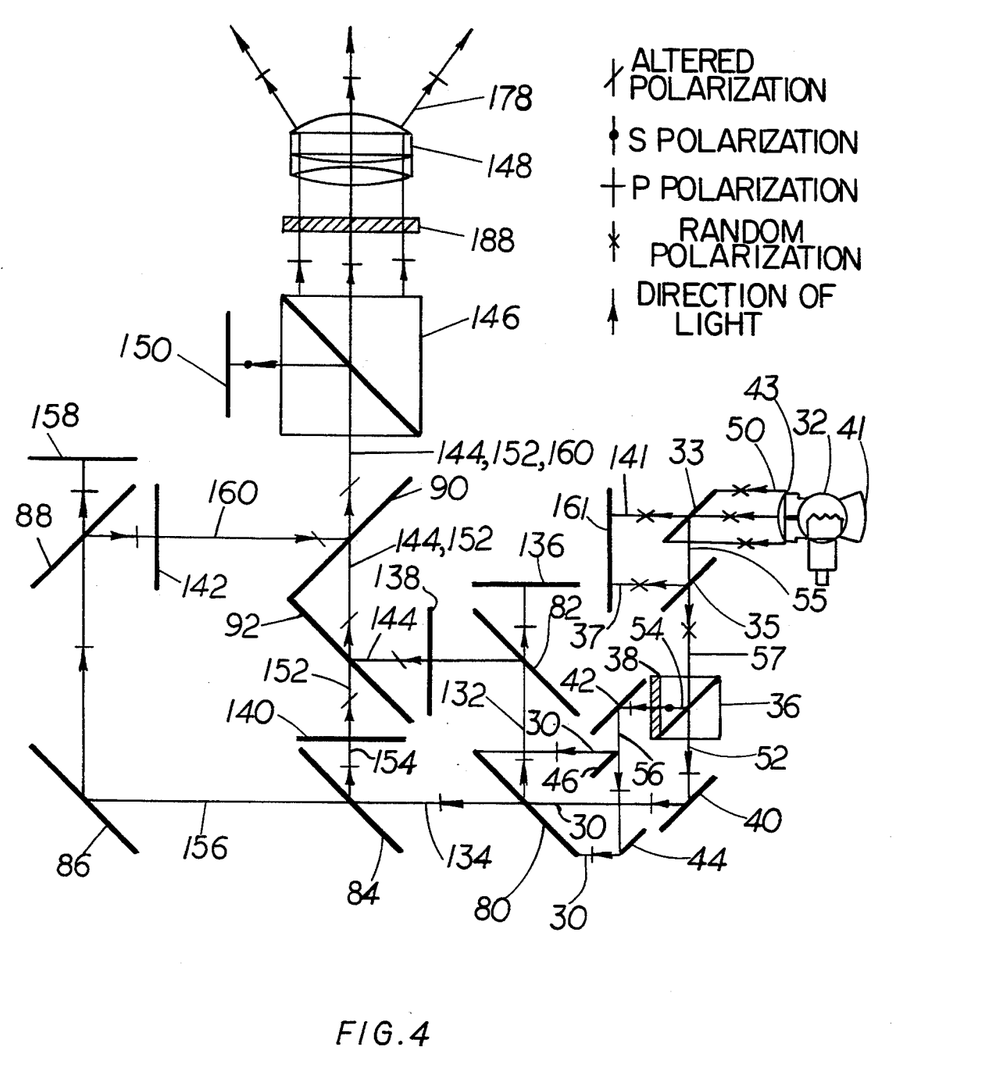
FIG. 4 is a diagrammatic representation of a color LCLV projector constructed in accordance with a preferred embodiment of the invention.

Referring now to FIG. 4, a projector constructed in accordance with an illustrative embodiment of the invention is shown. FIG. 4 is labeled with locative directions illustrating an optic path for convenience sake only and does not necessarily resemble what the actual layout may be. Other arrangements of the illustrative components connected in different optic paths may also be suitable.

A light source 32 (i.e., a xenon short arc lamp, a quartz-halogen lamp, a mercury vapor/xenon long arm lamp, etc.) emits light which is collimated into a source beam of white light 50 traveling toward the left that contains a wavelength spectrum of visible, infrared and ultraviolet light. Depending on the application, the lamp source can be any suitable means for producing a collimated beam of light. The characteristics of the light source may be tailored to a particular application.

The visible region of light that a typical person can see is between 400 and 700 nanometers in wavelength). The non-visible wavelengths between 200 nanometers to 400 nanometers are named the ultraviolet region and the non-visible wavelengths between 700 nanometers and 1500 nanometers are named the infrared region.

The infrared wavelength region (greater than 700 nanometers) and the ultraviolet wavelength region (less than 400 nanometers) each contribute watts of radiant light energy which are detrimental to the optics of the system but does not contribute to normal human eyesight). Because of this fact, the collimated source beam 50 from the light source 32 is directed to the left toward mirror 33 which is a dichroic/thin film dielectric mirror. Dichroic/thin film dielectric mirrors are able to function as wavelength filters. In general, these type of mirrors are constructed to transmit (i.e., pass through) all light having wavelengths longer (or shorter) than a reference wavelength and reflect the non-transmitted light.

The light wavelengths less than 700 nanometers which strike the coating on the front surface are reflected downward by an angle of 90° toward 35. The infrared portions 141 of the source beam 50 (wavelengths greater than 700 nanometers) are transmitted through mirror 33 and strike a beam block absorber shown schematically as 161. The beam block absorber 161 can be constructed of a black piece of aluminum (preferably with fins to radiate the heat, not shown) that absorbs the infrared wavelengths from the source beam 50 and re-emits the absorbed energy as heat, which can be carried away from the system and not introduced into the vital components which it might otherwise strike. Alternately, in place of a black piece of aluminum, other suitable means for absorbing infrared wavelengths may be utilized. Additionally, suitable means of separating or filtering the infrared component of the source beam 50 other than dichroic/thin film mirror 33 may be utilized.

The remaining wavelengths of the source beam 50 resulting in a new source beam 55 are reflected from mirror 33 downward (as viewed in FIG. 4) by an angle of 90° and strike the front surface of mirror 35. As with mirror 33, mirror 35 is formed as a wavelength filter so that the visible portion of the source beam 55 resulting in a new source beam 57 is transmitted toward a polarizer cube 36 located in an optic path with mirror 35. The ultraviolet portion 37 of the source beam 55 (wavelengths less than 439 nanometers) is reflected by an angle of 90° toward the beam block absorber 161 on the left. Alternately, in place of dichroic/thin film mirror 35 and beam block absorber 161, other means for separating and absorbing the ultraviolet components of the source beam may be provided.

The source beam 57 is next directed toward a means for polarizing the source beam 57 into two orthogonally polarized beams. In the illustrative embodiment in FIG. 4 of the invention, a polarizer cube 36 is utilized to separate the source beam 57 into a P-polarized beam 52 and an S-polarized beam 54. It should be further understood that when a polarizer cube is mentioned, that a polarizing plate or a piece of glass with a thin film polarizing coating deposited upon it, or a sandwich of glass, with the thin film polarizing layers deposed in between the glasses, can also be used for construction the system.

A suitable polarizer cube 36 is known in the art as a birefringent polarizer. In particular, one useful for this application is called a MacNellie Polarizer and is described in U.S. Pat. Nos. 2,403,731 and 2,449,287.

The polarizer 36, if constructed as a thin film Macneille polarizer, is sensitive to ultraviolet and infrared portions of the light spectrum because of the thin film coatings, thus the wavelength filtering by mirrors 33 and 35 that occurs before the beam enters the polarizer cube 36 is advantageous. This is because the ultraviolet light causes degradation of the internal coatings and the infrared light causes excessive heat buildup in the polarizer 36. The polarizer coatings start to absorb energy below 425 nanometer which will destroy their effectiveness. The polarizer 36 polarizes the source beam 57 into two orthogonally polarized beams, beam 52 and beam 54, of equal areas but with different polarizations. The P-polarized beam 52 is propagated straight through to strike mirror 40 where it is deflected by a 90° angle toward the left. The other polarization component of the source beam cube 36, the S portion of the source beam, i.e., beam 54, is deflected left through a 90° angle from the diagonal of the polarizer cube 36. This S-polarized beam 54 is converted or changed into a P-polarization direction by a suitable polarization converter such as a half-wave polarization retarder 38, or, alternately, by reflections from coated mirrors 42, 44, and 46.

The half-wave retarder 38 thus produces a second P-polarized beam 56. Second P-polarized beam 56 strikes mirror 42 and it is deflected by a 90° angle downward where it is deflected toward the left by mirrors 44 and 46. Mirrors 40, 42, 44 and 46 are front surfaced broadband mirrors that will maintain the P-polarization of the beam. Moreover, the reflective surfaces of these mirrors 40, 42, 44 and 46 can be generally rectangular in shape such that the beams reflected therefrom are also generally rectangular in shape. This allows a resultant unitary polarized beam to be formed with a generally rectangular outer peripheral configuration to match the light aperture of an LCD. The resultant unitary polarized beam 30 is thus doubled in its original size with the same rectangular area of the LCDs that it is going to strike and of one state of polarization, that is, a P-polarization.

Alternately, in place of the polarizer cube 36, any other suitable means for producing orthogonally polarized beams (52, 54) can be utilized. Additionally, means for converting (or changing) the polarization of one of the beams 54 other than the half-wave retarder 38 can be provided, such as reflection from coated mirrors 42, 44, 46. Moreover, other means than mirrors 40, 42, 44, 46 for combining the polarized beams 52 and 56 can be utilized. Finally the mirrors 40, 42, 44 and 46 can be placed in other arrangements for producing a resultant unitary polarized beam 30 having a shape that matches the rectangular peripheral shape of an LCD or LCD light aperture.

The rectangular polarized light 30 now encounters the coating surface of mirror 80 (which functions as a filtering means) where it is split into two beams 132, 134; beam 132 is deflected toward the top at an angle of 90° and beam 134 continues on through 80 to the left.

Deflected beam 132, traveling toward the top, is separated by mirror 80 into a beam containing wavelengths between 600 nanometers and 700 nanometers (the red portion of the visible spectrum) or, alternately, other predetermined portions of the light spectrum, and of the P-polarization state. At this time, the red beam strikes mirror 82 which functions as a second filtering means. As is apparent, these mirrors are selected to reflect the red portion of the visible spectrum and to allow wavelengths of less than 600 nanometers or, alternately, other predetermined portions of the light spectrum to pass through mirror 82 further filters the deflected red beam 132 so that it will match the CIE response needed for a good color balance. As an example, the mirror curve of mirror 82 can be shifted toward the right so that it will pass wavelengths below 615 nanometers or, alternately, other predetermined portions of the light spectrum and cause a deflected beam to appear deeper red to the human eye. Any "unwanted" wavelengths will pass through 82 and strike a red beam block 136 while the wanted wavelengths are deflected at an angle of 90° toward the left where they pass through a first LCD, which is termed as a red LCD 138. Beam block 136 can be fabricated in the same manner as beam block absorber 161 previously described.

Figure 2A:
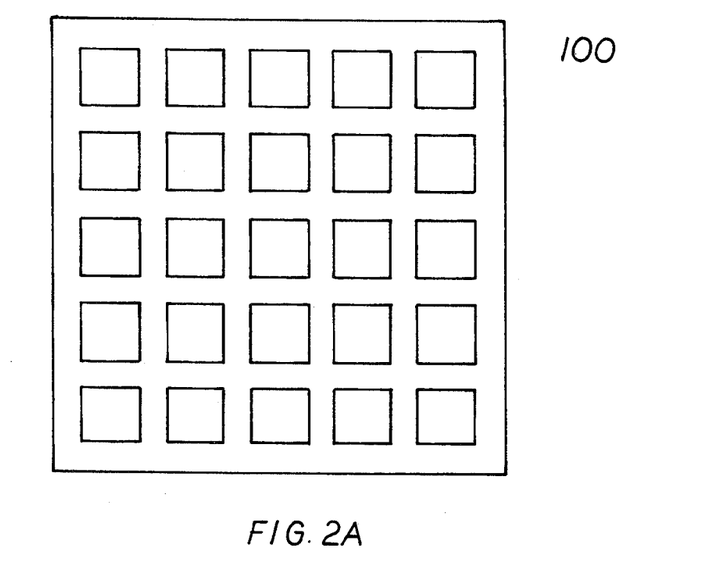
FIG. 2A is an schematic drawing of an LCD component showing the pixels used in the invention.

The red LCD 138 (as well as a green LCD 140 and a blue LCD 142 to follow) is of a type that can be caused to change its birefringence, thereby altering the orientation of the electric field vector of light passing through it, formed in a checkerboard arrangement with individual pixels 100 (see FIG. 2A). The red LCD so 138 is driven by electronics in which each cell alters the respective light portion by rotating the vector of the electric field according to the image that is desired to be displayed (change by "twisting" or rotating the polarization state, see FIG. 2A, by application of a voltage). The resolution of the projected image will depend upon the number of cells in the LCD. A display of 320 horizontal pixels by 240 vertical pixels will yield a display of 76,800 pixels. A typical television set is 115,000 pixels. Thus, the deflected red beam 132, having now passed through the red LCD 138, is now an altered red beam 144 comprising a combination of polarizations for the individual pixels of a display, each pixel having a predetermined orientation of electric field vector by the driving electronics. As will hereinafter be more fully explained, the amount of the rotation in the polarization state for an individual pixel will eventually decide how much of the light for that pixel will be passed all the way through to finally strike the screen used for display. At this point, the altered red beam 144 strikes mirror 92 and is deflected at an angle of 90° upward toward the top. The purpose of mirror 92 is to combine the altered red beam 144 and altered green beam 152 (as viewed in FIG. 4), mirror 92 thus functions as a combining means. It is best that mirror 92 does not change the state of polarization of the altered red beam 144 or any other beam striking it (i.e., altered green beam 152).

The deflected (from mirror 92) altered red beam 144 then continues on through mirror 90 which is constructed to pass any wavelengths greater than 515 nanometers or, alternately, other predetermined portions of the light spectrum. The purpose of mirror 90 is to combine the combined altered red 144 and altered green 152 beams with an altered blue beam 160, mirror 90 thus also functions as a combining means. It is best that mirror 90 does not change the state of polarization (orientation of the electric field vector) of any beam impingent upon it. The altered red beam 144 after passing through mirror 90 will continue on to a final polarizer called the polarizer analyzer 146. Polarizer analyzer 146 may also be a polarizer cube constructed as a MacNeille polarizer, or alternatively, as described above, on a single piece of glass or sandwiched between two pieces of glass. The vector component of the individual pixel light beams that is a P orientation of the electric field vector will pass through the polarizer analyzer 146 into a projection lens 148 and be projected as a part of beam 178 toward a screen (not shown in FIG. 4) according to the magnification of the projection lens 148. The vector component of the altered red beam 144 that is not a P vector component (S-polarization) will be deflected by the polarizer analyzer 146 toward the left and be absorbed by beam block 150. See FIG. 1B for a pictorial illustration showing how a particular vector component is resolved into two components, each having a different orientation of the electric field vector. Beam block 150 may be fabricated in the same manner as beam block absorber 161 previously described. Thus, the intensity of the red light at the viewing surface is directly proportional to the amount of rotation of the altered red beam's electric field vector.

Returning now to the single state of polarization rectangular light beam 30, it encounters the coating of mirrors 80 where it is split into two beams 132, 134. A red beam 132 is deflected toward the top 132 and the other beam, blue-green beam 134, passes through mirror 80 and continues on to the left. The blue-green beam 134 traveling through mirror 80 toward the left is a beam containing wavelengths between 415 nanometers and 600 nanometers (the blue-green portion of the visible spectrum) or, alternately, other predetermined portions of the light spectrum, and of the P-polarization state. Next, the blue-green beam 134 strikes the surface coating of mirror 84 and the green portion 154 of the beam (500-600 nanometers or, alternatively, other predetermined portions of the light spectrum) is deflected by a 90° angle upward toward the green LCD 140, while the blue portion 156 of the beam (425-500 nanometers or, alternately, other predetermined portions of the light spectrum) continues on through mirror 84 and toward mirror 86 at the left.

The green beam 154 passes through the green LCD 140. Each cell alters its respective portion of the green beam by rotating the orientation of the vector of the electric field according to the image that is desired to be displayed. Thus, the altered green beam 152, having now passed through the green LCD 140, is an altered green beam 152 comprising of a combination of polarizations for the individual pixels of a display, each pixel having a predetermined orientation of electric field vector by the driving electronics. The amount of the rotation in the polarization state for an individual pixel will eventually decide how much of the light for that pixel will be passed all the way through the polarizer analyzer 146 to finally strike the screen (not shown in FIG. 4) used for display. At this point, the altered green beam 152 strikes mirror 92. As previously stated, the purpose of mirror 92 is to combine the altered green beam 152 with the altered red beam 144. The altered green beam 152 passes through mirror 92 and propagates upward, mirror 92 does not change the state of polarization of the altered green beam 152 or any other beam (altered red beam 144) striking it.

The altered green beam 152 then continues on through mirror 90 because mirror 90 will pass any wavelength greater than 501 nanometers or, alternately, other predetermined portions of the light spectrum. As previously stated, the purpose of mirror 90 is to combine the altered blue beam 160. It is also preferable that mirror 90 does not change the state of polarization of any beam impingent upon or passing through it.

After passing through mirror 90, the altered green beam 152 now continues on through the polarizer analyzer 146. Any portion of the light of the individual pixels of altered green beam 152 that is of a P-polarized orientation will pass through the polarizer analyzer 146 into the projection lens 148 and be projected as part of beam 178 toward the screen (not shown) according to the magnification of the projection lens. The vector component of the altered green beam 152 that is not a P vector component (S component) will be deflected by the polarizer analyzer 146 toward the left and be absorbed by the beam block 150. Thus, the intensity of the green light at the viewing surface is directly proportional to the amount of rotation of the green beam's electric field vector.

Returning now to the blue-green light beam striking the coating surface of mirror 84 where it is split into two beams 154, 156. A green beam 154 is deflected at an angle of 90° toward the top and a blue beam 156 continues through mirror 84 to the left. The blue beam 156 traveling through 84 toward the left is a beam containing wavelengths between 415 nanometers and 500 nanometers (the blue portion of the visible spectrum) or, alternatively, other predetermined portions of the light spectrum, of the P-polarization state. The blue beam 156 continues on toward the left and strikes the surface coating of mirror 86 (mirror 86 may be a front surface broadband mirror; however, it must retain the P state of polarization for the blue beam) and the blue beam (415-500 nanometers or, alternatively, other predetermined portions of the light spectrum) is deflected at an angle of 90° upward toward the mirror 88.

At this time, the reflected blue beam 156 from mirror 86 strikes mirror 88 for further filtering. Further filtering can be done by mirror 88 on the blue beam 156 so that it will match the CIE response needed for a good color balance. Any "unwanted" wavelengths will pass through mirror 88 and strike a blue beam block 158 while the wanted wavelengths are deflected at an angle of 90° toward the right where they pass through the blue LCD 142. Blue beam block 158 may be constructed in the same manner as beam block absorber 161 previously described. As before, it is important that mirror 88 does not change the state of polarization of the blue beam 156. The blue portion of the blue beam 156 passes through the blue LCD 142. Each cell alters the respective light portion by rotating the vector of the electric field according to the image that is desired to be displayed. Thus, an altered blue beam 160, having now passed through the blue LCD 142, is now an altered blue beam comprising a combination of polarizations for the individual pixels of a display, each pixel having a predetermined orientation of electric field vector by the driving electronics. The amount of the rotation in the polarization state for an individual pixel will eventually decide how much of the light for that pixel passes all the way through to finally strike the screen (not shown in FIG. 4) used for display. At this point, the altered blue beam 160 strikes mirror 90 and is reflected upward at an angle of 90° toward the top (as viewed in FIG. 4) for combining with altered red beam 144 and altered green beam 152, mirror 90 will allow any wavelengths less than 500 nanometers, to be reflected or, alternately, other predetermined portions of the light spectrum. It is important that mirror 90 does not change the state of polarization of the altered blue beam 160, or any other beam striking it. The altered blue beam 160 now continues on to the polarizer analyzer 146. The vector component of the individual pixel light beams that is of a P-polarized component will pass through the polarizer analyzer 146 into the projection lens 148 and be projected as a part of beam 178 toward the screen according to the magnification of the projection lens. The vector component of the altered blue beam 160 that is not a P vector component (S vector component) will be deflected by the polarizer analyzer 146 toward the left and be absorbed by the beam block 150. Beam block 150 can be fabricated in the same manner as beam block absorber 161 previously described. Thus, the intensity of the blue light at the viewing surface is directly proportional to the amount of rotation of the blue beam's electric field vector.

At this point, all of the colors of the display (red, green and blue) have combined and the combined beam passes through the LCD 188. Each cell alters its respective portion of the beam by rotating the orientation of the vector of the electric field according to the image that is desired to be displayed. Thus, the altered beam, having now passed through the LCD 188, is an altered beam comprising of a combination of polarizations for the individual pixels of a display, each pixel having a predetermined orientation of electric field vector by the driving electronics. The amount of the rotation in the polarization state for an individual pixel will eventually decide how the light for that pixel will be displayed on the screen or the 3-D apparatus (not shown in FIG. 4) used for display.

The beam, having passed through the LCD is now directed to the projection lens 148 to be projected 178 onto the screen (not shown in FIG. 4).

The projection lens 148 is either a single lens or a combination of lenses that produces a good focused image on the screen. It has a back focal point of the distance equal to the distance from the rear of the lens to each one of the LCDs 138, 140, 142 in the system. This distance is made the same for all of the three LCDs.

In FIG. 4 the light source 32, the reflector 41, the collimating lens 43, mirror 33, mirror 35 and beam stop 161 work in accordance together, as detailed in the description of FIG. 4 above, for producing a beam of light 57 for the projector described.

The resolving of the light beam 57 is accomplished when it is sent through the polarizing means 36, as detailed in the description of FIG. 4 above, and resolved into two orthogonally polarized light beams 52, 54. The resolving can also include a half wave retarder 38 for producing light beam 56 which is of the same polarization as that of light beam 52.

The forming of the light beam 30 occurs when the two light beams are respectively reflected from forming means 40, 42, 44, and 46 into a single beam of light 30.

The separating of the beam, as described above for FIG. 4, includes the separating means 80, 84, 86. The formed polarized light beam 30 encounters the separating means 80 where it is separated into two beams 132, 134. Deflected beam 132 travels toward the top. The beam 134 strikes separating means 84 where it is separated into two beams 154, 156. Deflected beam 154 travels toward the top. The beam 156 strikes separating means 86 where deflected beam 154 travels toward the top.

Altering of the separate beams consists of the LCDs 138, 140, 142 or other suitable altering means, as described above for FIG. 4. Each beam passes through its respective LCD. Each cell alters its respective portion of a beam by rotating the orientation of the vector of the electric field according to the image that is desired to be displayed. Thus, an altered beam, having now passed through the LCD, is an altered beam comprising of a combination of polarizations for the individual pixels of a display, each pixel having a predetermined orientation of electric field vector by the driving electronics. The amount of the rotation in the polarization state for an individual pixel will eventually decide how much of the light for that pixel will be passed all the way through the polarizing means 146 to finally strike the screen used for display.

The adjusting of the beams 132, 156 is accomplished by the adjusting means 82, 88 and the beam stops 136, 158. Any "unwanted" wavelengths will pass though 82, 88 and strike beam block 136, 158 while the wanted wavelengths are deflected at an angle of 90° toward the respective LCD. Beam block 136, 158 can be fabricated in the same manner as beam block absorber 161 previously described above, as detailed in the description of FIG. 4 above.

The combining of the beams 144, 152, & 160 is accomplished by the combining means 90, 92. However, these combining means can also be used for adjusting if so desired by their beam pass/reflection criteria. The altered beam 134 travels through combining means 92, while altered beam 144 is deflected from combining means 92, which serves to combine the two beams 144, 152 into a single beam. It is preferable that combining means 92 does not change the state of polarization of any beam impingent upon or passing through it. This combined beam travels through reflecting means 90. It is preferable that combining means 90 does not change the state of polarization of any beam impingent upon or passing through it. The purpose of combining means 90 is to combine the combined altered 144 and altered 152 beams with an altered beam 160 into a single combined altered beam, as detailed in the description of FIG. 4 above.

After the beams have been combined into a single beam they are directed toward the resolving means where they are separated into two beams by the polarizing beam splitter means 146, with the desired separate beam being passed to the projecting means 148, as detailed in the description of FIG. 4 above.

Altering of the beam consists of the LCD 188 or other suitable altering means. Each cell alters its respective portion of the beam by rotating the orientation of the vector of the electric field according to the image that is desired to be displayed. Thus, the beam, having now passed through the LCD 188, is an altered beam comprising of a combination of polarizations for the individual pixels of a display, each pixel having a predetermined orientation of electric field vector by the driving electronics. The amount of the rotation in the polarization state for an individual pixel will eventually decide how the light for that pixel will be shown on the screen used for display.

The projecting means 148 can be either a single lens or a combination of lenses that produces a good focused image on the screen. It has a back focal point of the distance equal to the distance from the rear of the lens to each one of the altering means 138, 140, 142 in the system. This distance is made the same for the three altering means 138, 140, 142.

While the description above has been particularly shown and described with reference to preferred embodiments thereof, it will be understood by those skilled in the art that various changes in form and details can be made without departing from the spirit and scope of this invention.

Figure 5:
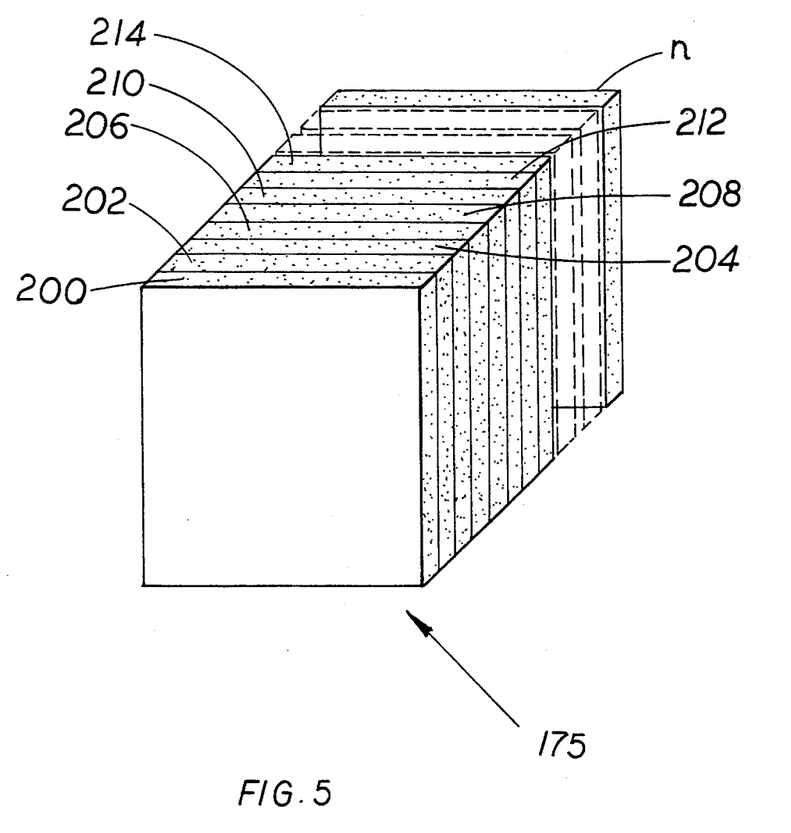
FIG. 5 is a schematic illustration of a preferred embodiment of a system for using a device as a 3-D screen or 3-D viewing cube.

FIG. 5 is the diagrammatic representation of the buildup of layers or a projection screen or the formation of a 3-D visualization cube. Referring now to FIG. 5, a new and novel display device is disclosed. The device acts in accordance with a beam generated by a 3-D projector such as disclosed in this document. The orientation of the electric field vector can be varied by such a device as a variable retarder that is placed between the beam polarizer analyzer 146 and the output lens 148, as shown in FIG. 4. This device acts by rotating the orientation of the electric field vector according to the drive electronics. This output beam is then fed into the device of FIG. 5. The device in FIG. 5 is a device made up of a multiplicity of layers, each layer having a coating that is different from the successive layer whereby each layer is reflective to a particular (or range) orientation of the electric field vector. For example, layer 200 is reflective to the electric field vector that corresponds to a vector that has rotation between 0° and 5°. Layer 202 is reflective to an electric field vector that has an orientation between 5° and 10°. Layer 204 is reflective to an electric field vector that has a rotation between 10° and 15°. This would continue on for the multiplicity of layers that are contained within the device in FIG. 5. Thus, when a beam is incident upon the device in FIG. 5, the first image plane is on layer 200, the next image plane is on layer 202, the next image plane on layer 204, etc. The final image on the nth plane 216 is then reflected. By having a multiplicity of layers, images are displayed.

An alternate to the above device would replace the reflection on the planes with ones that would absorb, with the final nth plane 216 transmitting the remaining light.

As an alternative to the step indexes of reflection, a device is used that has a graded index of reflection with respect to the electric field vector of rotation for each individual plane layer.

What is claimed is:

1. A three-dimensional image display device comprising three parallel elements each element forming an image plane for a projected beam of light having components of electric field vectors each element being formed from a transparent material, each element having a coating formed thereon, the coating adapted to reflect a selected portion of the projected beam of light having a predetermined orientation of a chosen component of the electric field vectors and to pass the remaining portion of the projected beam of light.

2. A three-dimensional image display device as described in claim 1 and wherein the coating for each element is formed of a dielectric material.

3. A three-dimensional image display device comprising two or more parallel elements each element forming an image plane for a projected beam of light having components at a predetermined orientation, each element being formed from a transparent material, each element having a coating formed thereon, the coating for each element including an absorbing means for absorbing a portion of the projected beam of light having a selected predetermined orientation of a chosen component of electric field vectors and means for passing the remaining portion of the projected beam of light.

4. A three-dimensional image display device as described in claim 3 in which the absorbing means includes a dielectric absorbing means.

5. A three-dimensional image display device for displaying an image from a 3-D projector which is adapted to form a projected beam of light having components at a predetermined orientation, said image display device comprising three or more parallel elements, each element forming an image plane for the projected beam, each element being formed from a transparent material, each element having a coating formed thereon, the coating for each element including a reflecting means for reflecting a portion of the projected beam of light having a selected predetermined orientation of a chosen component of electric field vectors and means for passing the remaining portion of the projected beam of light.

6. A three-dimensional image display device as described in claim 5 in which the reflecting means includes a dielectric reflecting means.

* * * * *